US008788645B2

(12) United States Patent  (10) Patent No.: US 8,788,645 B2
Beringer et al.  (45) Date of Patent: Jul. 22, 2014

(54) AUDIENCE SELECTION AND SYSTEM ANCHORING OF COLLABORATION THREADS

(75) Inventors: Joerg Beringer, Los Altos, CA (US); Tillman Neben, Bochum (DE)

(73) Assignee: SAP AG, Walldorf (DE)

( * ) Notice: Subject to any disclaimer, the term of this patent is extended or adjusted under 35 U.S.C. 154(b) by 484 days.

(21) Appl. No.: 12/650,119

(22) Filed: Dec. 30, 2009

(65) Prior Publication Data

US 2011/0161424 A1  Jun. 30, 2011

(51) Int. Cl.
 *G06F 15/173* (2006.01)
(52) U.S. Cl.
 USPC .............................. 709/223; 709/204; 709/205
(58) Field of Classification Search
 None
 See application file for complete search history.

(56) References Cited

U.S. PATENT DOCUMENTS

| | | | | |
|---|---|---|---|---|
| 7,069,300 | B2 * | 6/2006 | Toyota et al. | 709/206 |
| 7,257,569 | B2 * | 8/2007 | Elder et al. | 707/731 |
| 7,328,242 | B1 * | 2/2008 | McCarthy et al. | 709/204 |
| 7,882,191 | B2 * | 2/2011 | Sood | 709/206 |
| 7,904,515 | B2 * | 3/2011 | Ambati et al. | 709/205 |
| 8,032,470 | B1 * | 10/2011 | Heidenreich et al. | 706/45 |
| 2003/0023686 | A1 * | 1/2003 | Beams et al. | 709/205 |
| 2003/0028596 | A1 * | 2/2003 | Toyota et al. | 709/204 |
| 2004/0083265 | A1 * | 4/2004 | Beringer | 709/204 |
| 2005/0114781 | A1 * | 5/2005 | Brownholtz et al. | 715/733 |
| 2005/0144499 | A1 * | 6/2005 | Narahara et al. | 714/1 |
| 2005/0149401 | A1 * | 7/2005 | Ratcliffe et al. | 705/14 |
| 2006/0167760 | A1 * | 7/2006 | Chakraborty et al. | 705/26 |
| 2006/0173702 | A1 * | 8/2006 | Saxena et al. | 705/1 |
| 2007/0168885 | A1 * | 7/2007 | Muller et al. | 715/853 |
| 2007/0226628 | A1 * | 9/2007 | Schlack | 715/733 |
| 2009/0006413 | A1 * | 1/2009 | Andersen | 707/10 |
| 2009/0292595 | A1 * | 11/2009 | Tonnison et al. | 705/11 |
| 2009/0307213 | A1 * | 12/2009 | Deng et al. | 707/5 |
| 2010/0030578 | A1 * | 2/2010 | Siddique et al. | 705/3 |
| 2010/0049683 | A1 * | 2/2010 | Carter | 706/46 |
| 2010/0057855 | A1 * | 3/2010 | Chakra et al. | 709/206 |
| 2010/0162135 | A1 * | 6/2010 | Wanas et al. | 715/753 |
| 2010/0250683 | A1 * | 9/2010 | Hoyne et al. | 709/206 |
| 2011/0010384 | A1 * | 1/2011 | Luo et al. | 707/769 |
| 2011/0119598 | A1 * | 5/2011 | Traylor et al. | 715/753 |

OTHER PUBLICATIONS

Budzik, Jay et al.: Clustering for Opportunistic Communication, Dep't of Computer Science, Northwestern Univ, Evanston, IL; WWW 2002, May 7-11, 2002, Honolulu, HA, USA; ACM 1-58113-449-5/02/0005; pp. 726-735.

(Continued)

*Primary Examiner* — Dhairya A Patel
(74) *Attorney, Agent, or Firm* — Blakely, Sokoloff, Taylor & Zafman, LLP

(57) ABSTRACT

A social network server provides collaboration networking capability for a network system such as a business system. A user can request to tie a collaboration thread to an anchor in the system. The anchor is a primary topic, which can be selected from topics provided by the system, or entered by the user. The selectable topics are derived from within the system. Whether selected or entered, the topic is associated with the collaboration thread to allow the thread to be managed as a resource in the system. The audience for the collaboration thread is controlled by the user, where topics can be applied as filters to generate an audience. The primary topic directs audience selection, and additional audience selection can be achieved by applying boundary topics. The collaboration thread is presented only to the audience, and the audience can be dynamically altered.

19 Claims, 5 Drawing Sheets

(56) References Cited

OTHER PUBLICATIONS

Mori, Junichiro et al.: Find Me if You Can: Designing Interfaces for People Search, Intelligent User Interface Lab, DFKI, German Research Center for Artificial Intelligence, Saarbruecken, Germany; IUI 2008, Jan. 13-16, 2008, Maspalomas, Gran Canaria, Spain; copyright 2008, ACM 978-1-59593-987-6 08 0001; pp. 377-380.

* cited by examiner

AUDIENCE SELECTION AND SYSTEM ANCHORING OF COLLABORATION THREADS

FIELD

Embodiments of the invention are related generally to interaction of users over networks, and embodiments of the invention are more particularly related to social networking, enabling user-selection of a collaboration audience.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2009, SAP AG, All Rights Reserved.

BACKGROUND

Social networks are increasing in popularity and are commonly used for sharing information. Public communities represent potentially valuable information sources that can leverage the wisdom of the crowd. However, the ability to find information can be extremely difficult given the amount of information, the lack of structure to organize it, and the broad reach of the social networks. Thus, emerging social networks have limited applicability in enterprise and business contexts because the business relevance of emerging topics is rather low. Additionally, there are situations and topics where posting in a way that unknown individuals can view would be inappropriate from a business perspective.

Thus, there are situations in which any of a variety of conditions matter such as trust in topic participants, confidentiality, and reduction of spam, where posting into a large anonymous audience might be culturally inadequate as well as ineffective for the intended purpose. In addition to confidentiality and security risk, the ratio of "signal to noise" or good information versus useless or bad information is too high in current social networks to be of significant use in business situations, and reduces the usefulness of current social networks even in social contexts.

Additionally, community conversations or social networking interactions arising in current social networks are fragmented and redundant, making relevant information harder to find. There are a great number of social networking possibilities with no underlying structure to assist a user in determining relevance of topics, making it difficult for users to track and contribute to desired conversations. For at least all of the above reasons, current social networking offerings do not provide an effective forum for social networking in a business context.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
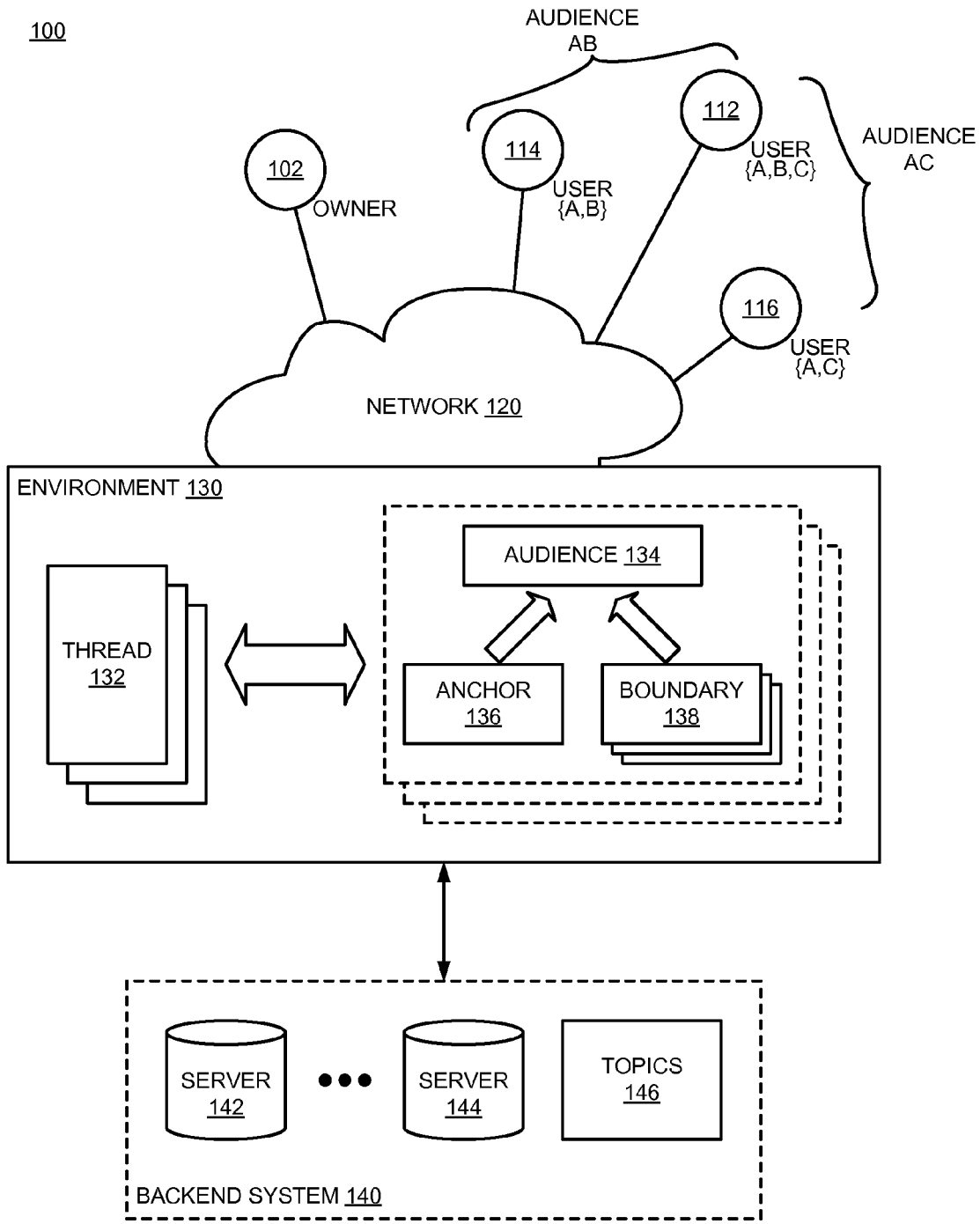
FIG. 1 is a block diagram of an embodiment of a system having an environment with an underlying structure for social interaction.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As described herein, social network collaboration for a backend, networking system is provided. The collaboration described herein combines the concepts of public communities with personal networking and boundaries. The boundaries allow the collaboration to be based on principles that users associate with trust, expertise, or natural boundaries of communication. When initiating a collaboration related to a community of interest, a user can limit the reach of the message in time and space by filtering the audience based on boundaries that reflect personal trust zones such as location, profession, organizational unit, language, or other boundaries. The boundaries enable users to determine how close people in the community of the selected audience are to themselves. As used herein, a collaboration refers to any of a number of social networking interaction concepts such as conversations, threads, or other structured or ad hoc interactions. "Collaboration thread" is used to refer to a collaborative instance, or a sequence of interactions related to a selected topic.

A collaboration thread is associated with one or more topics that can be managed by the underlying backend system in which the thread is created. The backend system may be a business or enterprise system. The topics can be either derived from information stored in the system (which is thus already managed by the system), or can be entered by the user to become stored in the system and manageable by the system. The entered topics become context resources of the network resources of the system used as topics and boundaries. The context resources are system items associated with the network resources that provide contextual information to the network resources. The association of threads with topics may be referred to as "anchoring" collaborations to network resources, where the network resources refer to the primary anchor topic and zero or more additional boundary topics that define boundaries for the intended audience. In one embodiment, users can establish personal or private networks of trust. Such personal network may be maintained on personal clients or as network information maintained in social relationship profiles, similar to what is used in certain online social networking sites.

The audience selection may be achieved by intersecting the users associated with the primary topic with users associated with the identified boundary topics. The audience selection may be achieved by ANDing or ORing different boundaries together. Additionally, a selected audience could also be dynamically modified by simply selecting a different primary topic or making a change to boundary topic selection. Thus, the audience can be defined and dynamically expanded or contracted as desired by the posting user.

FIG. 1 is a block diagram of an embodiment of a system having an environment with an underlying structure for social interaction. System 100 is a networking environment that allows multiple users to be interconnected. Network 120 may be a single network, or may include multiple separate networks. The networks may be private or closed networks, wired and/or wireless, and may or may not include wide-area networks such as the Internet. Thus, network 120 includes servers, routers, switches, cabling, hardware interfaces, and other hardware to exchange messages and data between points in the network. Network 120 also includes software executing on machines to implement and manage the network interconnectivity. The specific network architecture is not necessarily important.

System 100 includes backend system 140, which represents one or more components that can store and manage data for a networking environment. In one embodiment, backend system 140 is a business and/or enterprise system, which stores and manages data for a business and/or enterprise. In one embodiment, backend system 140 is a cloud system, where one or more social networking mechanisms are provided through a cloud application. Backend system 140 includes one or more servers 142 through 144, which may include hardware and software components. Backend system 140 includes at least one or more processors or processing resources to execute instructions and memory to store instructions and data. The instructions and data direct the backend system to perform operations related to providing an environment as described herein, generating a social collaboration anchored in the system, and providing audience selection. There are many different server architectures known, and any architecture that can perform the operations described herein is suitable for providing audience selection and topic anchoring of collaborations. In one embodiment, backend system 140 is a business system that includes an ERP (enterprise resource planning) system. The ERP system may in turn include systems such as a CRM (customer relations management) system, SCM (supply chain management) system, as well as systems for individual departments or areas (e.g., human resources (HR), engineering, sales, or other areas).

In one embodiment, backend system 140 includes topics 146, which represents a list or a catalog of topics from the backend system that may be chosen as collaboration anchors. Topics 146 may include topics specifically defined in backend system 140 for purposes of social collaboration, topics derived from business data stored in the system, or topics imported from external to backend system 140. In one embodiment, a user can enter a topic as an anchor choice, in which case it may then be stored in backend system 140. The backend system may provide potential or candidate topics for selection by a user from topics 146. Not all topics would necessarily need to be provided in every case.

System 100 communicates with various users, 102, 112, 114, and 116. User 102 is specifically referenced in FIG. 1 as "owner" 102. In one embodiment, a user that makes a topic selection or initiates a collaboration is an owner-user of the collaboration. The owner may also be referred to as the sender or presenter of a collaboration. The collaboration can be associated with the owner (e.g., through metadata tagging of the user, the collaboration, a resource associated with the collaboration, or a combination of these) in backend system 140. Owner 102 initiates a collaboration by selecting topics presented as potential collaboration anchors, and/or by entering a topic. Users 112, 114, and 116 represent the potential candidates of users that may belong to an audience selected by owner 102. The selection and restricting to different users is described in more detail below with respect to environment 130. It will be understood that while system 100 illustrates the users as connected to network 120, a user accesses the network via a client device that operates as a node on the network. The device may be associated with the user as a person (e.g., a personal computer) or publically accessible (e.g., a public terminal).

Environment 130 represents an environment through which owner 102 can initiate a collaboration and select an audience for the collaboration. Environment 130 will be understood as an abstraction that is provided by one or more hardware components, for example, server devices of backend system 140 and/or a client device of owner 102. Environment 130 is a collective term that refers to one or more hardware and software components and collaborations of users. Environment 130 may include various user interfaces (possible examples of which are mentioned in more detail below) through which users access collaborations. Access to the collaborations may be to initiate as well as participate in the collaborations.

Environment 130 includes one or more threads 132, each of which represents a distinct instance of collaboration. Instances of collaboration are created as thread 132, which thread exists within backend system 140, and can be stored and managed as a resource within the system. Each thread has an associated unique audience 134. Describing the audience as "unique" will be understood to refer to an association of the audience to the thread, making an audience a property of the thread. It is possible that multiple collaborations will have the same audience. However, each audience is still unique to a collaboration when it is assigned through a process of audience selection. The uniqueness of the audience is in contrast to having general audiences to which a collaboration is posted, rather than deriving or selecting an audience for each separate thread instance. As used herein, audience 134 refers to a collection of identifiers that each represent a human user and/or user device. Thus, as will be understood by those skilled in the art, an audience can be a collection of users as identified in a server of the system by a user ID or other identifier.

Audience 134 is assigned to thread 132 by anchoring the thread to one or more topics, represented in environment 130 as anchor 136 and boundary 138. Anchor 136 may also be referred to as a primary topic or primary anchor topic, and is the principle topic to which the user assigns a collaboration. Based on associations of users with anchor 136, an audience is created for the collaboration. Zero or more additional topics may be selected as represented by boundary 138. Each boundary topic can provide additional restrictions on audience selection. The combination of primary anchor topics and boundaries provides the audience instance 134 to be associated with a thread 132.

The combination of anchor 136 with boundary 138 is an intersection of users associated with the anchor and the boundary. In this way, boundary 138 provides restrictions to audience 134. While there is an intersection or a logical ANDing of anchor 136 and boundary 138, the application of multiple boundaries can be handled in different ways. Two or more boundaries may be intersected through performing a logical AND operation. Similarly, two or more boundaries may be combined through performing a logical OR operation, associations of the users to either the first boundary topic or the second boundary topic includes the users in audience 134. Additionally, combinations of ANDing and ORing boundaries together can also be accomplished (e.g., ANDing two boundary topics together, ORing the combination with another boundary topic, and applying the final result as a filter to the primary topic).

In one embodiment, topics have a type or a class. Thus, there may be a structure applied to the system that classifies the topics. The type or class may be assigned as a property to each topic in the system, and/or it may be derived from where the topic originates in the system (e.g., originates from within a particular system, or has a particular class). In one embodiment, ORing of boundary topics is performed only for boundary topics that are of the same type or class.

Just as the audience can be selected by applying boundaries to the primary topic, an assigned audience can be dynamically modified. Thus, a collaboration may be created and assigned an audience. After the collaboration is presented to the assigned audience, it may be determined that the collaboration is a better fit for a different audience, as defined by a different set of primary and boundary topics. Thus, owner 102 can redefine the audience by changing the primary topic to a different topic, and/or changing boundary topics. Additionally, a selected audience to which a collaboration has been presented may be further narrowed by applying one or more additional boundary topics to further narrow the audience. Thus, users that originally belonged to the audience may then be excluded based on the application of a boundary topic with which they are not associated.

As a short example, consider the artificial assignment of associations represented in system 100. User 112 is associated with topics A, B, and C. User 114 is associated with topics A and B, and User 116 is associated with topics A and C. Users may be associated with topics through any of a variety of explicit or inferred relationships. Explicit relationships may include subscription of a user to a topic, or inclusion of a user in a particular business group, project team, or other category. Inferred relationships may also be derived from business group, project team, or other category, such as inferring the use of certain tools, or the knowledge of certain information in such groups.

Returning to the example, if owner 102 assigns topic A as the primary anchor, initially each of the other users is part of the audience. Applying topic B as a boundary topic would limit the audience to users 112 and 114. Alternatively, applying topic C as a boundary topic would limit the audience to users 112 and 116. The application of the topics could be when initiating the collaboration or to dynamically alter the audience after the collaboration is established and has been presented to an initial audience.

As another short example of combinations of topics, consider that all users 112, 114, and 116 are associated with an unidentified primary topic. If a boundary of B or C was applied, all users would still be part of the audience. However, a boundary of A and B would eliminate user 116 from the audience. Other combinations and examples will be understood by the reader.

In one embodiment, system 100 supports a "follow user" model. A follow user model is based on selecting a user as an anchor to a collaboration. Other users can subscribe to the user-anchors, allowing them to follow the postings of the virtual topic channel that has a user as the primary anchor topic. In one embodiment, a communication pattern is enforced for collaborations having users as primary anchors to allow only the user who represents the anchor (the user-anchor) to post, while other users simply receive and follow the postings. Such a model may provide for optional ownership or authorization with respect to the anchor, with the user-anchor being implied as the owner, and authorization to post defaulting to being limited by the user-anchor. The use of a follow user model can be useful, for example, in a business context allowing teams to be an anchor, and posting being restricted to a team lead that updates the team members about their work. In general, authorization of a user to post to a collaboration can thus be controlled based on a role of the user (e.g., in a business context, the role can be the employee role, or a role with respect to the collaboration such as owner, team leader, or member of a group).

As mentioned above, the collaboration threads can be referenced in the backend system to their topics. In one embodiment, a selectable resource is chosen as a topic, where the selectable resource is modeled in the backend system. Modeling a resource in the system refers to the system generating a structure including parameters and behaviors of the resource. Resources already in the system are modeled as part of the being in the system. Topics entered by a user can be modeled to become a resource in the system. In one embodiment, the collaboration thread is associated with or referenced by a network resource modeled in the backend system, to be a resource of the network resource. For example, the collaboration may be a context resource, which provides information or archived data about the resource and provides context for the network resource. The collaborations may be indicated by the system to users, or may simply exist and require a user to look for them.

The description with reference to system 100 illustrates various details with reference to the specific system. A more general description without reference to any particular drawing element follows.

As discussed above, audiences can be selected for collaborations, and the collaborations are anchored in the backend system. The audience selection provides dynamic and customizable access to distribution channels for social networking-based conversations and collaborations. Unlike known systems, which allow a user to post under a preselected subject heading, as described herein the user selects a primary topic, which becomes the primary channel for the collaboration. Additional topics can be selected to act as audience refinement, allowing the user to place boundaries on the scope of reach of the collaboration. Also unlike known systems, the collaboration audience can be dynamically redirected or redefined by the presenter as discussed above.

The topics for anchors can be common interests that are strong enough to seed communities of interest. The anchors can be tools or methods being used by users, professions or areas of business being performed, strategic topics or initiatives being discussed, or any of a number of business contexts such as supplier, customer, product, or organizational unit. The anchors may also be any of a number of business objects in the system, or inferred relationships such as geography or location. In one embodiment, the anchors are derived from an ERP and people profile data to create a catalog of potential anchors.

A conversation tool can enable a user to initiate conversations or collaborations anchored at one of the concepts underlying the derived anchors. In one embodiment, anchor or topic types such as tools, professions, or other grouping can be used to create explicit relationships between communities.

For example, a particular profession or business area uses a particular tool, or a particular practice group is interested in a particular topic because it is related to a project. The explicit relationships can be used to recommend or distribute related collaborations and anchors.

Further customization of the anchored topic and the associated audience selection can be provided by allowing a user a private network of trust. Certain "friends" can be selected over the course of a user's participation in the social networking When a topic is presented by the user, and the user selects the channel and boundaries for the audience, the system can indicate which, if any, individuals within the trust network are part of the selected audience. This allows the user, for example, to first present to the "friends" and then expand outward as appropriate, or start broad and narrow to certain individuals (friends and/or experts).

The audience selection and anchoring of collaborations to system topics provides a number of benefits over currently available system. One benefit from crossing public communities of interest with applied boundaries and network information is to enable managing the reach of a post. Management of the audience can be expected to increase the value of return on a post. The increased value of return can be presumed at least because there should be a significant reduction in the amount of irrelevant messages sent and received to users, reducing the problem of overload. Subscribers to a community of interest should have an increased expectation of relevant information being shared.

One benefit to anchoring the collaborations is that it can be expected to provide much shorter turn-around to making the social network relevant. Current social networking technology is hard to justify installing in a business, seeing that time to value is either entirely unpredictable or expected to be very long. In contrast, by deriving and storing anchors and associations of users to anchors from existing ERP or other network data, communities can be set up and active from day one after deployment. By providing a type property to anchors, the system can guide users to understand what content is anticipated to be exchanged in what community. The storing of entered information allows the system to dynamically change with increased knowledge of the communities. The guiding to anticipated relevant content can increase the quality of collaborations and increase their relevance. A mechanism for explicitly anchoring collaborations within the backend system can also be used to archive collaborations. Archived collaborations can become a useful resource in the form of a catalog of community archives.

In one embodiment, anchoring a collaboration as described herein allows for meta management of an underlying service that enables collaboration. Thus, the collaboration framework may include anchor management of different systems that can allow origination of threads based on anchors. For example, Twitter (available from Twitter, Inc. of San Francisco, Calif.), discussion forums, RSS (really simple syndication) feeds, blogs, or event notification systems can originate from anchors and provide systems with restrictions on who can post to whom. Each of these different systems can have different policies on how posting is allowed. By providing anchor management, the communication patterns of all of the systems, with their different posting restrictions, can be managed at a level above the actual collaboration service. In one embodiment, a company can decide to enable more hierarchical channels (for example, one sender, multiple followers) or collective channels (e.g., all selected users are senders and listeners). With the explicit anchors, the boundaries of audience can be more effectively and more flexibly managed than by trying to implement a tagging system that allows users to tag and listen to chosen topics of interest.

Figure 2:
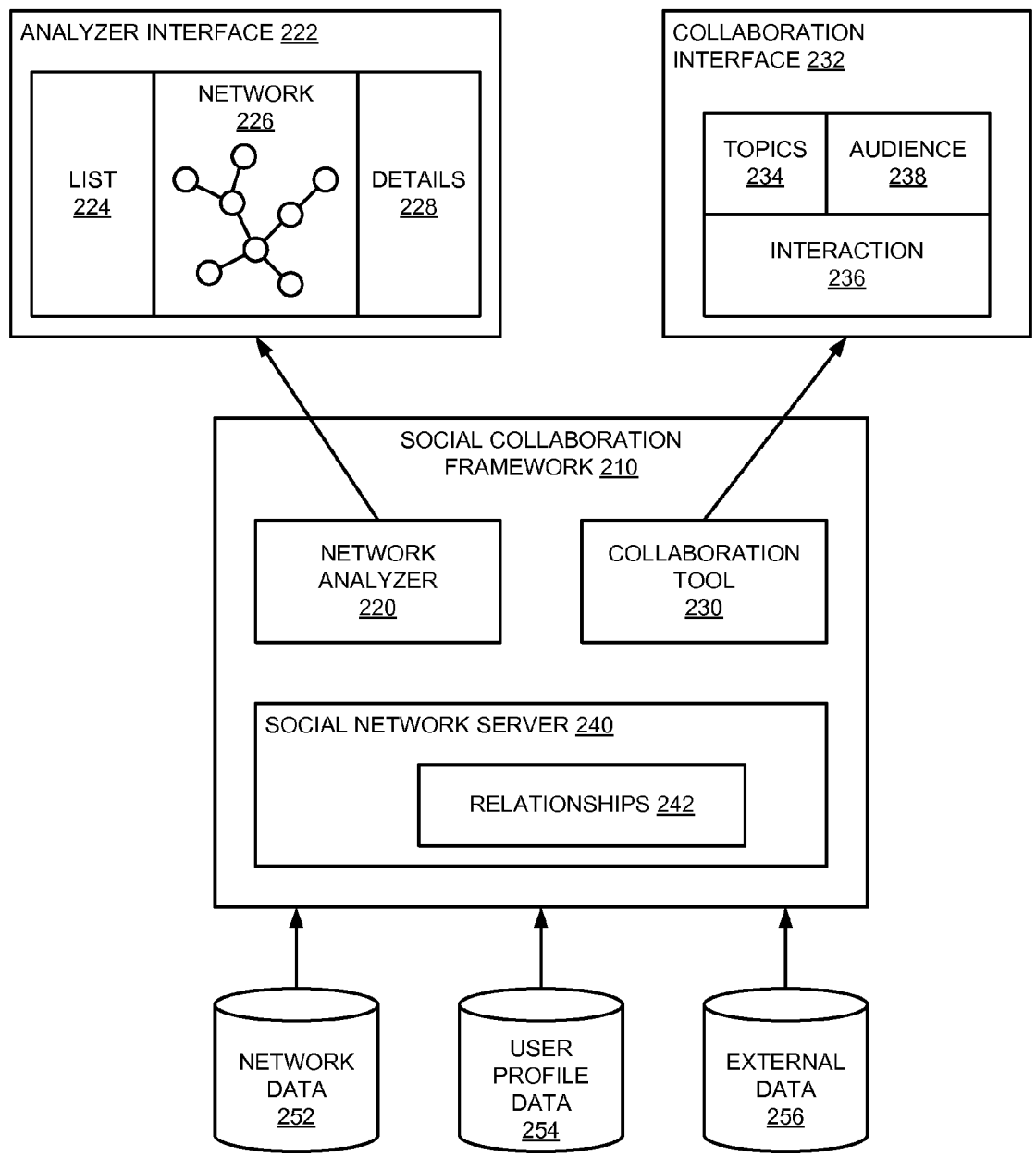
FIG. 2 is a block diagram of an embodiment of a system including a social collaboration framework to provide social networking with audience selection.

FIG. 2 is a block diagram of an embodiment of a system including a social collaboration framework to provide social networking with audience selection. System 200 provides an example of a system parallel to system 100 of FIG. 1. Social collaboration framework 210 and interfaces 222 and 232 provide a collaboration environment and enable users to interact via structured social networking as described herein. The various data sources 252, 254, and 256 may be part of backend system, such as a business system.

System 200 includes social collaboration framework 210. Framework 210 includes components that enable a user to initiate a collaboration in a structured social networking environment. The social networking environment is considered to be structured because of the various mechanisms and tools to implement the mechanisms described herein. As mentioned above, collaborations are initiated within a backend system, and can be monitored and managed through the system. The collaborations themselves can be stored as a resource within the system. Associations of users to certain topics are defined within the system, and the associations are used to implement the audience selection.

Framework 210 includes network analyzer 220, which enables the system to determine associations of users and topics for initiation of a collaboration and audience selection by a presenter. Network analyzer 220 includes hardware and software in the backend system that can access the data of the backend system, and present it in a meaningful way for purposes of social networking Network analyzer 220 can exchange data with social network server 240. Data exchange may include providing information from network analyzer 220 to social network server 240. Thus, social network server 240 is provided with the information necessary to manage the social networking. Social network server 240 may request an analysis of network analyzer 220 in determining information to present in a collaboration environment. In one embodiment, network analyzer 220 executes as part of social network server 240.

Analyzer interface 222 presents the data to a user. One example of interface elements are illustrated with list 224, network 226, and details 228. While shown in a particular configuration in system 200, it will be understood that interface 222 is a non-limiting example, and other configurations are possible. Network 226 is a representation of network relationships. In one embodiment, network 226 provides a graphical representation of network topics and/or network users. A graphical representation may be useful in helping a user determine how to post a collaboration in the social networking environment.

List 224 can provide a list of the various elements mapped in network 226. The list may include additional details about the elements. Details 228 represents an area of interface 222 where details regarding one or more elements of network 226 can be displayed. Thus, a specific element of the network can be selected, and the system can provide details about the item.

Network 226 may be understood to include data objects or business objects or other structured data within a business system. Data objects include structured data with methods or behavior definitions. Business objects are data objects that have a particular business focus, and the behavior may be tied in with the business system in ways that make efficient use of business software hosted on the business system. In one embodiment, collaborations are tied to or associated with business objects of the business system.

Collaboration tool 230 may be independent of social network server 240, or may alternatively be part of the server.

Being independent may include having a separate software entity and/or be part of separate hardware. Collaboration tool 230 executes business logic to perform operations that interface users with collaborations. The interfacing may be for initiation of a collaboration and for interaction with an existing or runtime collaboration. Collaboration tool 230 provides collaboration interface 232, which may be laid out in any manner convenient for the system in which it is implemented. Example features of collaboration interface 232 may include topics 234, audience 238, and interaction 236. Other features may be present in certain implementations.

Topics 234 represent mechanisms through which a user may select and/or input topics as anchors for collaborations. The anchors may be primary topics and boundary topics. In one embodiment, topics 234 include lists of topics or drop-down menus of topics. The lists or drop-down menus may be dynamic in that the selection of one topic may alter the possible selections of other topics. In one embodiment, the topics may include multiple fields, such as a field showing general categories of people that: are interested in particular topics, use certain tools, are within a line of business, are in a profession, are related to a business object, are at a location, or other topics related to people. Another field in topics 234 may refine the selected "type" of person selected. There may be additional field(s) providing even more specificity of the topic.

Audience 238 may be included to provide a display of the audience. The display may be as simple as a display of what the primary and boundary topics are, and how many people are encompassed in the audience for the given primary and boundary topic parameters. In one embodiment the audience display is dynamically updated, and automatically changes its values based on what is selected by the user in topics 234.

Interaction 236 may provide any of a number of interface mechanisms to allow a user to input to a thread, to select and join threads, to respond and post, or any perform any other type of interactive action. It may be convenient to use similar interfaces to those that are familiar based on other known interactive interfaces such as chats or social network interfaces. Thus, interaction 236 includes at least an area where a user can view the collaboration and interact with it by reading, obtaining materials or data, and providing comments and/or data.

Social network server 240 includes processing logic to coordinate and enable social collaboration as described herein. Server 240 enables network analyzer 220 and collaboration tool 230 with data to present to users, and receives and processes user input from network analyzer 220 and collaboration tools 230. Server 240 enables the social interaction to be stored in and managed by the backend system. In one embodiment, server 240 includes relationships 242, which are explicitly defined (e.g., subscriptions) or inferred from data in the backend system. Relationships 242 may not necessarily be stored in server 240, but have significance for audience selection, which is managed by server 240. Relationships 242 may be derived (either retrieved or computed) from ERP data 252, user profile data 254, and/or external data 256.

Data stored within network data 252, user profile data 254, and/or external data 256 may be or include business resources to which users and collaborations are related and have associations. Network data 252 includes data of one or more backend servers. In one embodiment, network data 252 is ERP data, which stores business objects and data of one or more business system servers. User profile data 254 may include a variety of information, such as data defining and/or implying relationships of users to network resources, and personal network information for users. External data 256 includes other data not included in network data 252 and user profile 254, and may include data obtained from external to the backend system. The external source may be accessed over storage media (e.g., storage devices that store data) and/or communication media (e.g., media that transmit and receive signals to exchange data).

Figure 3:
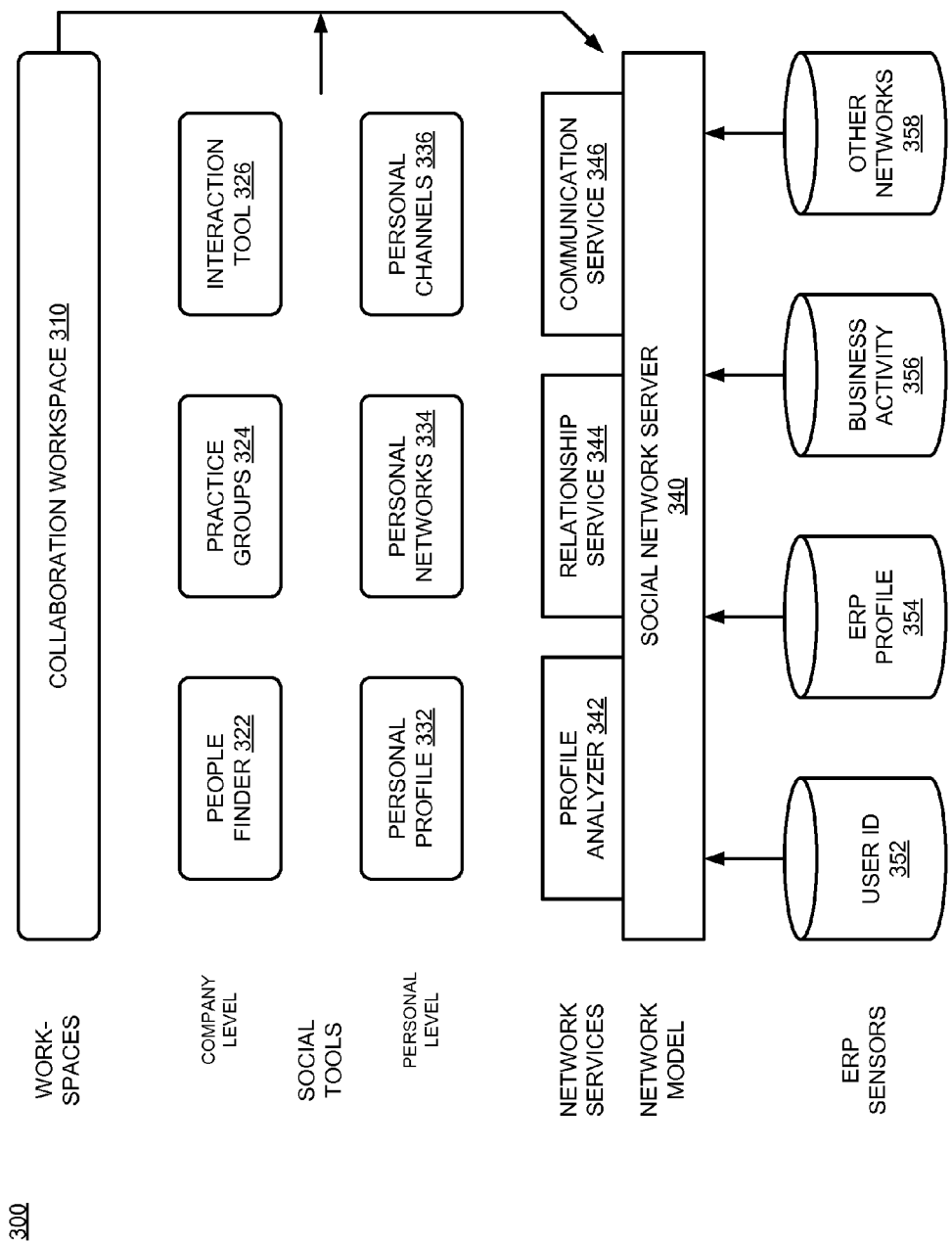
FIG. 3 is a block diagram of an embodiment of a collaboration environment with audience selection.

FIG. 3 is a block diagram of an embodiment of a collaboration environment with audience selection. The collaboration environment illustrated includes an abstract representation of tools, services, and data models that enable the social networking with audience selection as described herein. The example of system 300 is made specifically with reference to a business system, but will be understood to have applicability to other backend systems that support networking The general "flow" of the levels starts at the server or business system level with the ERP sensors, and moves up toward a user at the top or workspace level. Alternatively, the abstract representation could be described as starting at the top with the collaboration level that a user interfaces down to the business system level.

Collaboration workspace 310 refers to any collaboration and analysis interfaces (such as those described with respect to FIG. 2) that system 300 may provide to enable a user to initiate a collaboration, define or redefine an audience (perform audience selection), and participate in a collaboration. Collaboration workspace 310 thus includes one or more user interfaces, and business logic and service interfaces to enable a user to interact with data of the business system. Collaboration workspace 310 includes software that may execute on a user client device and/or on the business system.

Social tools include any tools, data, engines, or servers that can provide data and interaction with collaboration workspace 310. Each social tool element may be separate logic that executes under one or more collaboration workspaces, or operates in parallel with the workspaces. In FIG. 3, the social tools are organized in columns according to type for company level tools and personal level tools, and lined up with a corresponding service that enables corresponding social tools of the same column.

Thus, at a company level, people finder 322 enables a user to identify individuals within the business system. Each individual may have a user profile (e.g., personal profile 332) that indicates information useful in determining what qualifications, expertise, and/or interests a particular user has. Business resource associations may also be included within the profile. Knowing such information can inform a presenter of a collaboration whether the particular user may be desirable to include in participation in a collaboration. People finder 322 and personal profile 332 are enabled by a profile analyzer service 342. Profile analyzer 342 can extract and derive information including associations from particular user profiles.

Relationships may be organized as company level practice groups 324 and personal level personal networks 334. Practice groups 324 include areas of business and professions of which people may be a part. Personal networks 334 include personal or private networks, which may be stored locally to a user client device, or may be stored in system data. In one embodiment, a user-owner is assigned to a collaboration thread. The system may default to have the owner be the user that initiates a collaboration, but it is possible to have one user initiate a collaboration on behalf of another user, or to create a collaboration that gets assigned to a different user. The user to whom the collaboration is assigned through association is the owner of the thread. In one embodiment, a presenter or user-owner's network of trust or personal networks are first searched for matches to the audience selection. The assigned audience may then be members only of the network of trust, even though other network users would potentially match the audience selection criteria.

Practice groups 324 and personal networks 334 are enabled by relationship service 344, which represents one or more network services that provides access to network information. The networks are stored in the business system, and can be retrieved upon request. In general, network services include interfaces and logic that executes to perform operations to allow access to the social tools. Network services may include web services or services enabled within an enterprise network (enterprise services, based on a service oriented architecture (SOA) within the enterprise). In one embodiment, the various network services are interface methods of the network model of social network server 340.

In the final column, communication tools may include interaction tool 326 at the company level and personal channels 336 at the personal or user level. Interaction tool 326 provides mechanisms for the collaboration tools mentioned above to enable a user to access and interact with a collaboration. Personal channels 336 refer to specific collaborations and specific subscriptions associated with a particular user. Thus, if a user subscribes to a particular topic or business resource, collaborations related to that topic will be communicated to the user. Reference to a user subscribing to a topic refers to a user indicating creating an association with the particular topic with social network server 340. When subscribed, the user will be part considered for inclusion in an audience for the selected topic even when the system may not otherwise determine the user is related to the topic through other avenues.

Communication service 346 enables interaction tool 326 and personal channels 336. Communication service 346 refers to one or more mechanisms that enable a user to receive or view collaboration threads, access data (such as attachments or shared files) that are part of the thread, and post comments or data to the thread.

Collaboration workspace 310 and social tools are accessed and employed to interact with social network server 340. Server 340 is accessible to the social tools and collaboration tools via the network services. Server 340 includes one or more models, referring to modeling aspects of the social network. The network as a whole may be modeled to show relationships among people and collaborations. Each business resource may be modeled, and each model may have specific parameters that affect how the network services are used, or the logic used to access services.

Server 340 connects to ERP sensors, which may include user ID (identifier) 352, ERP profile 354, business activity 356, and other networks 358. ERP sensors refer to any data or business system parameters that can be used to trigger collaboration or audience selection for the collaboration. User ID 352 identifies users within the system. Based on identification of the user, social networks derive the appropriate data for use in social networking. ERP profile 354 provides one or more parameters about users based on data in the ERP systems. In one embodiment, ERP profile 354 informs the system about specific associations of a user with a business resource (e.g., through subscription), and may include information related to personal networks, and information about groups and organizations to which a user belongs. Business activity 356 includes information related to projects and workflows and other business activities in the system that users may be involved in. Other networks 358 refer to any other business system information that has not been specifically addressed, which may be understood by those of skill in the art, and which may be useful for enabling the social tools and/or the collaboration workspaces.

Figure 4:
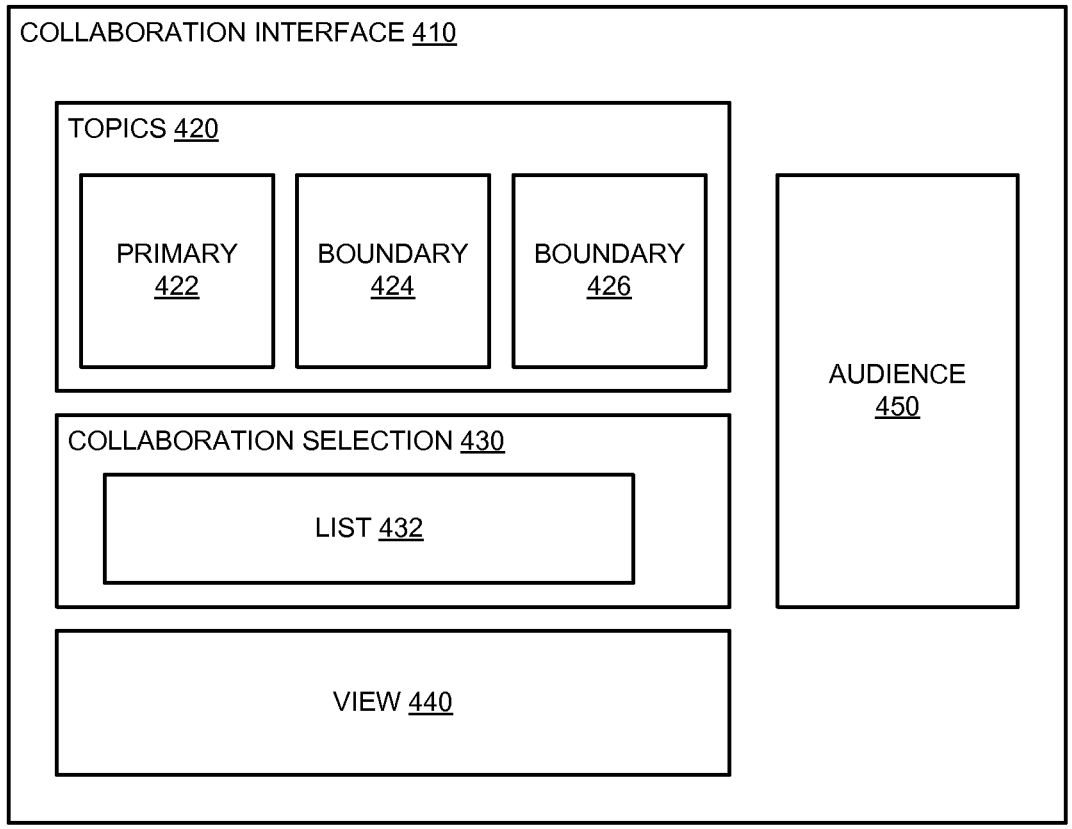
FIG. 4 is a block diagram of an embodiment of a collaboration interface.

FIG. 4 is a block diagram of an embodiment of a collaboration interface. Collaboration interface 410 illustrates one example of a collaboration interface such as that illustrated in system 200. Similar to what is described above, the example of FIG. 4 will be understood to provide examples only, and is not to be understood as limiting as to the elements of the interface nor as to the layout of the interface. While the example of FIG. 4 is described in reference to a business system, it will be understood that the components and functions described could be applied to other backend systems that have clients accessing from a frontend.

Collaboration interface 410 includes topics 420, which provides interface mechanisms to enable a user to view and select possible anchors for a collaboration. Primary topic 422 represents the primary business resource to which the collaboration will be anchored. The primary topic may be selected from a list of topics derived from the business system (not specifically shown in FIG. 4). The topics may be retrieved from a catalog of topics configured in the business system.

Anchoring the collaboration ties the collaboration to the business system, and may be performed with any of a number of types of topics (e.g., people, tools, places, or other topics). However, in one embodiment, primary topics are derived conceptually from the perspective of 'people,' such as people that do certain things, have certain jobs or skills, or other some other category of people. Conceptually it makes sense to use people as the primary anchor, given that collaboration interface 410 is principally a tools used for social networking, and finding people would be the logical order for most users. However, other systems could be implemented that have a broader or a different set of primary topics that is not necessarily oriented from a 'people' perspective. For example, business objects directed to customers, organizations, projects, or other 'organizational' ordering might make sense in certain implementations.

Zero or more boundary topics may be applied to the primary anchor. Thus, boundaries 424 and 426 are illustrated. There may be a practical limit on the number of boundaries that could or should be applied, but in theory there is no limit to the number of filtering boundaries a user may wish to apply to a primary topic. Without any boundaries, a post to a primary topic may be unreasonably broad, reaching audience members that have no interest in the subject matter of the post, or who would not be good candidates for receiving the post. Too many boundaries may exclude useful contributors from having the opportunity to participate in the collaboration. As mentioned above, if it is determined that the audience is too narrow, it can be dynamically altered to broaden the reach of the collaboration. Conversely, if the audience is considered to be too broad initially, the audience can be narrowed. Alternatively, the audience may not necessarily be too broad or too narrow but simply reaching the "wrong" group of participants, which can be changed by applying different boundaries to shift the focus to a different audience.

Collaboration selection 430 provides an interface field or pane that allows a user to view activity on a posted subject. In one embodiment, collaboration selection 430 may provide a post history showing who posted what at what time. Users can then "enter" the conversation at any time and come up to speed based on the history of the collaboration on the subject. In one embodiment, list 432 represents the history described. In another embodiment, either collaboration selection 430 or another field or pane in collaboration interface 410, may provide a list (such as list 432) of active collaborations. Thus, a user can looks into collaborations to which s/he is part of the audience. Thus, collaborations may be shown by subject matter, and potentially include other identifying or informational details, such as when the last post happened, and by who, or how many people are part of the audience.

View 440 provides an area in collaboration interface 410 where a collaboration selected from collaboration selection 430 or another area can be viewed or previewed. In one embodiment, either in view 440 or another area of collaboration interface 410, a user can post to a selected or viewed collaboration.

Audience 450 can provide information to a user about the audience for a collaboration being initiated (through selection of topics 420). For example, a dynamic update can be provided of the primary and boundary topics, and the current audience size. In one embodiment, details about the audience selection may also be available or viewable from the audience pane 450. For example, details of the audience may be dynamically provided regarding who within a network of trust is part of audience, what location or locations are involved in the audience, what experts or areas are expertise are captured by the audience, or other details.

Figure 5:
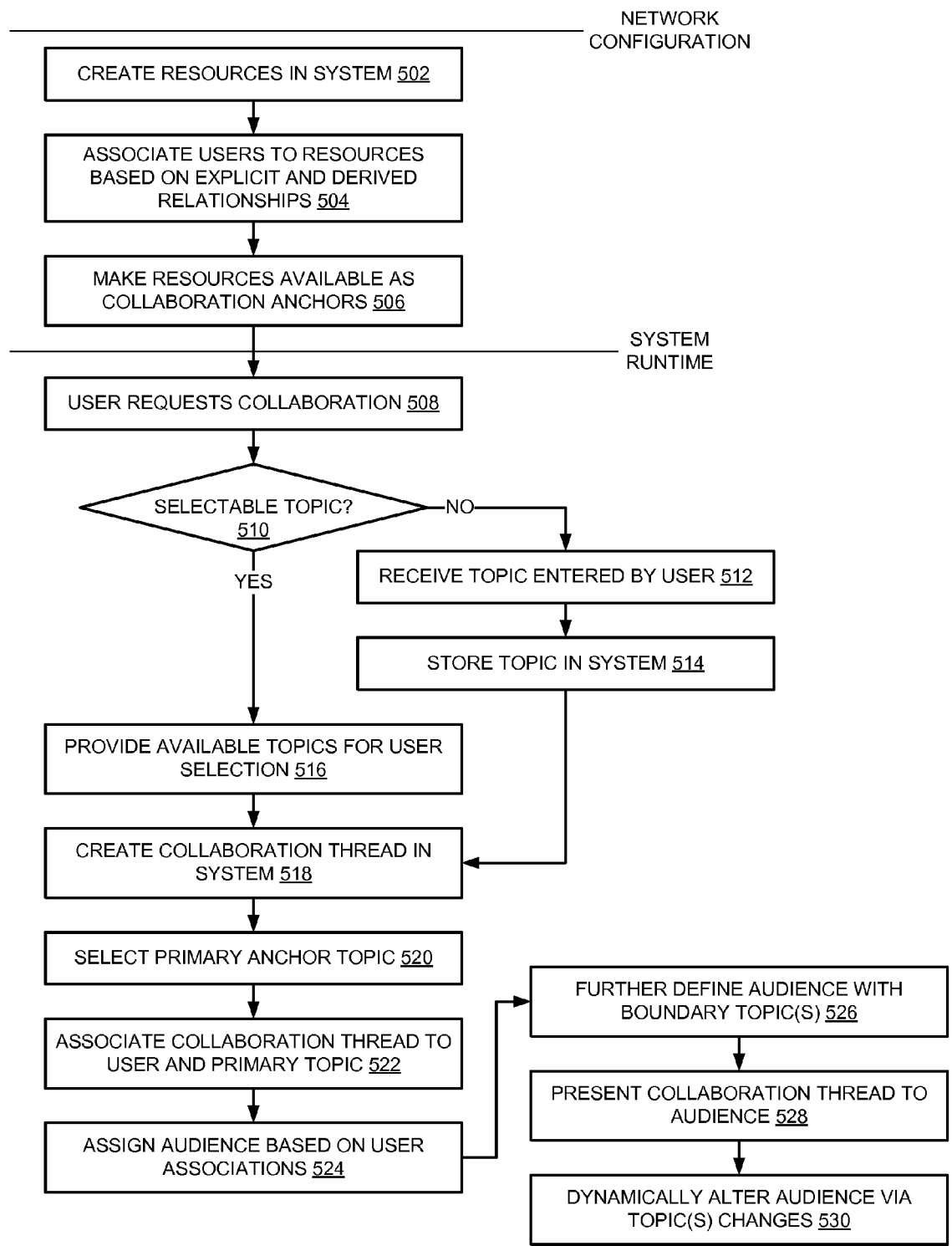
FIG. 5 represents a flow diagram of an embodiment of selecting an audience for collaboration.

FIG. 5 represents a flow diagram of an embodiment of selecting an audience for collaboration. Flow diagrams as illustrated herein provide examples of sequences of various process actions. Although shown in a particular sequence or order, unless otherwise specified, the order of the actions can be modified. Thus, the illustrated implementations should be understood only as an example, and the process can be performed in a different order, and some actions may be performed in parallel. Additionally, one or more actions can be omitted in various embodiments of the invention; thus, not all actions are required in every implementation. Other process flows are possible.

The flow diagram is separate to illustrate possible optional network configuration operations as well as runtime operations of the system where audience selection and collaboration anchoring are performed. As part of the optional system configuration, one or more resources are created in a networking system, 502. The resources may be created, for example, in a business system as part of the normal course of conducting business in the company, or may be created specifically for purposes related to social networking Many resources may already exist in the system at the time social networking is enabled or deployed, in which case the resources may simply be identified.

Configuration may also include associating users to resources based on explicit and derived relationships, 504. The relationships may also exist in the system prior to implementation of social networking, and/or may be created for social networking Derived relationships may exist, but may be determined on the fly during runtime by the social collaboration server. The system can make the created and identified resources available as collaboration anchors, 506.

For system runtime, the user requests a collaboration, 508. The user request for the collaboration is performed through the collaboration interface as discussed above. The user request may be to initiate a new subject of collaboration for which anchors will be chosen, or for a collaboration for which the user has permission to modify the audience assignment or selection. Referring to selection or modification of an audience assignment, the system determines if the user selects from among selectable topics, 510.

If the user does not select from among selectable topics, the system receives a topic entered by the user, 512. The system can store the entered topic in the system as a resource, to model and manage the topic, 514. If the user selects is to choose from selectable topics, 510, the system provides available topics for user selection, 516. If the user enters a topic (510, 512, 514) or selects one of available selectable topics (510, 516), the system creates a collaboration thread in the system, 518.

The created collaboration thread is associated with the topics in the system, and associated with the user-owner. The selected topic is selected as a primary anchor topic, 520, and the collaboration thread is associated with the user and the primary topic, 522. The system assigns an audience to the collaboration thread based on user associations stored in the system or derived or selected, 524. For example, the audience may be selected in accordance with user relationships to business resources as provided in the network configuration.

In addition to audience assignment based on the primary topic, the audience may be further defined based on selected boundary topics, 526. The boundary topics may be additional selectable topics derived from system data, or topics entered by a user. Topics entered by a user may need to be modeled in the business system prior to assigning an audience based on the topic. The system can determine based on the entered topic type and subject what associations are express or implied from the entered topic, and assign an audience based on the associations.

After the audience is defined, the system presents the collaboration thread to the audience, 528. The users can then interact within the collaboration thread on the posted subject. Even after selection and presentation of the thread, the system can dynamically alter the audience based on user-owner input via changes to one or more topics (primary and/or boundary) to direct the collaboration thread in a way to make effective use of the community.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communication interface to send data via the communication interface. A machine or computer readable storage medium may cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A computer implemented method comprising:
    receiving at a server of a backend system that supports a network of users, an indication of a topic selected as a primary topic to be an anchor for a collaboration thread, wherein the backend system is to model the primary topic as a data structure available as a network resource to the users in the network, wherein the collaboration thread is associated with the data structure in the backend system;
    creating the collaboration thread in the backend system in response to receiving the indication, to provide a collaborative environment for multiple users;
    associating, in the backend system, the created collaboration thread to the primary topic to anchor the collaboration thread to the primary topic in the backend system, including referencing the collaboration thread in the backend system as a context resource of the network resource of the primary topic;
    assigning an audience of users unique to the collaboration thread, the audience defined by the primary topic and one or more additional topics selected as boundary topics that provide boundaries to the primary topic,
        wherein the backend system includes definitions of associations of users to the topics, and the audience is assigned by intersecting users associated to the primary topic with users associated with the one or more boundary topics;
    presenting the collaboration thread to the assigned audience to enable only the assigned audience to participate in the collaboration thread; and
    dynamically altering the assigned audience after presenting the collaboration thread to the assigned audience by dynamically changing either the primary topic or a boundary topic of the collaboration thread.

2. The method of claim 1, wherein receiving the indication of the primary topic further comprises:
    receiving the indication in response to providing selectable topics derived from a catalog of topics stored in the backend system.

3. The method of claim 1, wherein receiving the indication of the primary topic further comprises:
    receiving a topic entered by a user of the backend system, the backend system to model the entered topic as a network resource within the backend system.

4. The method of claim 1, wherein assigning the audience of users comprises:
    assigning users to the audience based on explicit and inferred associations of the users to the network resources.

5. The method of claim 1, wherein assigning the audience of users comprises:
    assigning users to the audience based on subscriptions of the users to the primary and boundary topics.

6. The method of claim 1, wherein assigning the audience of users comprises:
    assigning users to the audience with an authorization level with respect to posting to the collaboration, wherein the authorization level is based on a role of the user.

7. The method of claim 1, wherein first and second boundary topics are selected, and wherein assigning the audience comprises:
    performing a logical AND operation to filter the audience based on associations of the users to both the first boundary topic and the second boundary topic.

8. The method of claim 1, wherein first and second boundary topics are selected, and wherein assigning the audience comprises:
    performing a logical OR operation to filter the audience based on associations of the users to either the first boundary topic or the second boundary topic, where the first boundary topic and the second boundary topic have the same type.

9. The method of claim 1, wherein dynamically altering the audience by changing the topic further comprises:
    dynamically altering the audience by changing multiple boundary topics of an assigned audience.

10. The method of claim 9, wherein the assigned audience is assigned based on the primary topic and a first boundary topic, and wherein dynamically altering the audience comprises:
    narrowing the audience by applying an additional, second boundary topic as a narrowing filter.

11. The method of claim 1, wherein assigning the collaboration thread to the audience further comprises:
    assigning the collaboration thread to a user-owner that initiated the collaboration thread; and
    further comprising:
    generating a network of trusted users associated with the user-owner, wherein presenting the collaboration thread to the assigned audience comprises presenting the collaboration thread to users only within the network of trusted users whose defined associations match the primary topic and the boundary topic.

12. The method of claim 1, wherein the backend system comprises a business system.

13. The method of claim 12, wherein receiving the indication of the primary topic further comprises:
    receiving the indication in response to providing selectable topics derived from business objects of the business system.

14. The method of claim 12, wherein receiving the indication of the primary topic further comprises:
    receiving the indication in response to providing selectable topics identified as forming communities of interest, the topics including one or more of an area of practice, location, use of a business tool, or a business goal.

15. The method of claim 12, wherein the business system comprises an ERP (enterprise resource planning) system.

16. An article of manufacture comprising a non-transitory computer readable storage medium having content stored thereon, which when executed, cause a machine to perform operations including:
    receiving at a server of a backend system that supports a network of users, an indication of a topic selected as a primary topic to be an anchor for a collaboration thread, wherein the backend system is to model the primary topic as a data structure available as a network resource to the users in the network, wherein the collaboration thread is associated with the data structure in the backend system;
    creating the collaboration thread in the backend system in response to receiving the indication, to provide a collaborative environment for multiple users;
    associating, in the backend system, the created collaboration thread to the primary topic to anchor the collaboration thread to the primary topic in the backend system, including referencing the collaboration thread in the backend system as a context resource of the network resource of the primary topic;

assigning an audience of users unique to the collaboration thread, the audience defined by the primary topic and one or more additional topics selected as boundary topics that provide boundaries to the primary topic, wherein the backend system includes definitions of associations of users to the topics, and the audience is assigned by intersecting users associated to the primary topic with users associated with the one or more boundary topics;

presenting the collaboration thread to the assigned audience to enable only the assigned audience to participate in the collaboration thread; and dynamically altering the assigned audience after presenting the collaboration thread to the assigned audience by dynamically changing either the primary topic or a boundary topic of the collaboration thread.

17. The article of manufacture of claim 16, wherein the content for assigning the audience of users comprises content for assigning users to the audience based on explicit and inferred associations of the users to the network resources.

18. The article of manufacture of claim 16, wherein the content for assigning the audience comprises content for one or more of performing a logical AND operation to filter the audience based on associations of the users to both the first boundary topic and the second boundary topic, or performing a logical OR operation to filter the audience based on associations of the users to either the first boundary topic or the second boundary topic, where the first boundary topic and the second boundary topic have the same type.

19. The article of manufacture of claim 16, wherein the content for receiving the indication of the primary topic further comprises content for receiving the indication based on one or more of selectable topics derived from a catalog of topics stored in the backend system, a topic entered by a user of the backend system, selectable topics derived from business objects of the business system, or selectable topics identified as forming communities of interest, the topics including one or more of an area of practice, location, use of a business tool, or a business goal.

* * * * *